April 13, 1954

D. SILVERMAN 2,674,885

GRAVITY METER MOTION COMPENSATOR

Filed Aug. 17, 1949

*INVENTOR:*
Daniel Silverman

BY Newell Pottoff
Attorney

Patented Apr. 13, 1954

2,674,885

UNITED STATES PATENT OFFICE 2,674,885

GRAVITY METER MOTION COMPENSATOR

Daniel Silverman, Tulsa, Okla., assignor to Stanolind Oil and Gas Company, Tulsa, Okla., a corporation of Delaware Application August 17, 1949, Serial No. 110,827

11 Claims. (Cl. 73—382)

This invention relates to geophysical surveying and is directed particularly to the compensation of a gravity meter for the motion of a base upon which the meter is located. The invention is especially useful in the surveying of water-covered areas using a gravity meter which is placed on the marine floor at the bottom of the water.

In surveying with the gravity meter over water-covered areas, one of the most frequent difficulties encountered is lack of a stationary base upon which to set the instrument to take readings. The accelerations accompanying oscillation of ship-mounted platforms are far too large to permit operation of a sensitive gravity meter on board ship. Consequently, it has been the general practice in marine gravity surveying to provide the gravity meter with a water-tight housing having space either for remote-control devices or for an observer, and to lower the meter and housing to the marine floor. Even here, however, difficulty has been encountered, especially in shallow water and when there are long wave-length swells on the water surface, in that the marine bottom itself does not remain stationary but oscillates with the passage of the waves or moves with the passing of water currents. As a result, if it is indeed possible to get gravity meter readings at all when the water surface is not perfectly smooth, they have been obtained only by some process of averaging the swings of the gravity meter beam over a period of observation, either visually, or by some recording mechanism. In any event, for readings of the accuracy ordinarily desired, prolonged periods of observation are often required to get a reliable average.

It is accordingly a primary object of my invention to provide a novel and improved gravity meter system for obtaining readings with the instrument on an unsteady base. Another object is to provide an improved gravity meter system having a compensator which makes possible very rapid and accurate reading of the acceleration of gravity in the presence of varying accelerations to which the meter also responds. A further object is to provide a gravity meter compensation system which can observe the transient accelerations to which the system is subject and apply to the gravity meter beam a corresponding acceleration to hold it at rest with respect to the gravity meter housing, thereby facilitating reading the steady component of acceleration, which is the desired gravity. Still another object is to provide a compensating system for a gravity meter which can take the output of any of several motion-measuring devices and transform it into suitable electrical currents or forces for compensating either the gravity meter itself or its electrical output. A still further object of the invention is to provide a system for determining the motion of an oscillating marine gravity meter housing relative to a comparatively stable portion of the ocean bed and applying the resultant determination to the gravity meter or its readings. Other and further objects, uses, and advantages of the invention will become apparent as the description proceeds.

Stated in a general manner, the foregoing and other objects are accomplished by providing the housing of the marine gravity meter with a separate motion-detecting device which produces an electrical output proportional either to the displacement, velocity, or acceleration of the gravity meter housing responsible for oscillation of the gravity meter beam. This electrical output is then suitably amplified, and its phase adjusted so that it can be applied after amplitude regulation either to cancel out the corresponding amplitude variations in the electrical output of the gravity meter, or to the gravity meter moving system itself to hold it in a steady position. The preferred motion-detecting mechanism is a system similar to the gravity meter system itself and preferably pivoted in the same sense, so as to respond to the oscillations of the marine floor in the same way. According to another embodiment of my invention, it is possible to measure the variations in water pressure at the position of the submerged gravity meter and utilize these to provide the varying electrical output or force for compensating the gravity meter. According to still another embodiment, a probe is driven through the soft portion of the marine floor into a more consolidated formation, which is more nearly at rest than the portion where the meter is situated; and by means of a relative motion detector, an electrical current is generated suitable for compensation of the submerged gravity meter.

This will be more readily understood by reference to the accompanying drawings showing illustrative embodiments of the invention, in the different figures of which drawings the same numerals are applied to corresponding parts. In these drawings.

Figure 1:
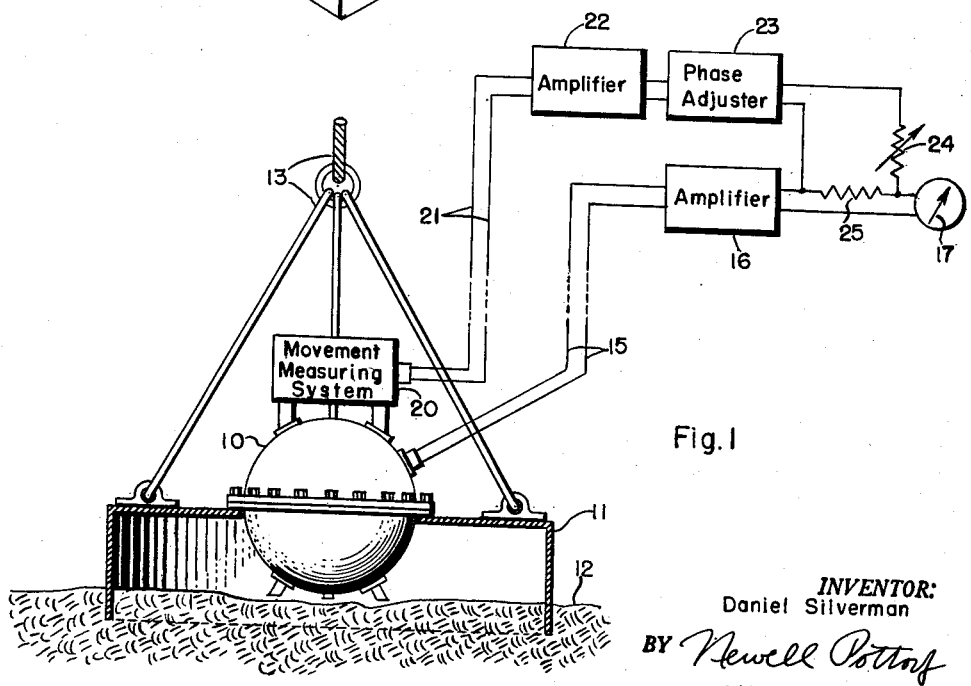
Figure 1 is a view partially diagrammatic showing a typical embodiment of the submerged gravity meter with a compensating system applied to the electrical output.

Referring now to these drawings and to Figure 1 in particular, a marine gravity meter housing 10 is shown on a horizontal mounting platform 11, suitable for lowering to the marine floor and assuming a stationary position, as the platform 11 readily sinks into and comes to rest on the soft mud bottom 12. The platform 11 and meter housing 10 are raised from the marine floor or lowered from ship board by suitable links and a cable 13 attached to the platform and extending to a transporting vessel, not shown.

No particular form of gravity meter within the housing 10 is necessary, as any of several types may be used; however, it is preferred that the gravity meter produce an electrical output which is transmitted to the water surface over the wires 15 where it is amplified by an amplifier 16, if necessary, and the output of the amplifier is read on an indicating or recording meter 17. As the marine floor 12, and hence the gravity meter in housing 10, is subject to constant small amplitude oscillations, the reading of meter 17 varies in a corresponding manner. If the gravity meter is a null-type instrument, it is rendered extremely difficult to determine the null position for the moving beam; while, if it is a deflection-type instrument, the stationary reading of the output indicator 17 is equally difficult to determine.

In accordance with my invention, a movement-measuring system 20 is mounted directly on the gravity meter housing 10 and transmits over the wires 21 to the water surface an electrical signal proportional to the displacements undergone by the housing 10. The signal is then amplified as required by an amplifier 22, its phase is adjusted by a phase adjuster 23 to be 180° out-of-phase with the corresponding signal from the gravity meter output amplifier 16, and the amplitude of the phase-adjusted signal is adjusted to an exactly compensating value by the variable resistor 24. The resultant signal is then applied across a resistance 25 in series between amplifier 16 and indicating device 17 and, in effect, cancels out the variations in the reading of the gravity meter, producing on the indicator 17 a steady reading proportional to gravity or to the null of the gravity meter instrument.

Figure 2:
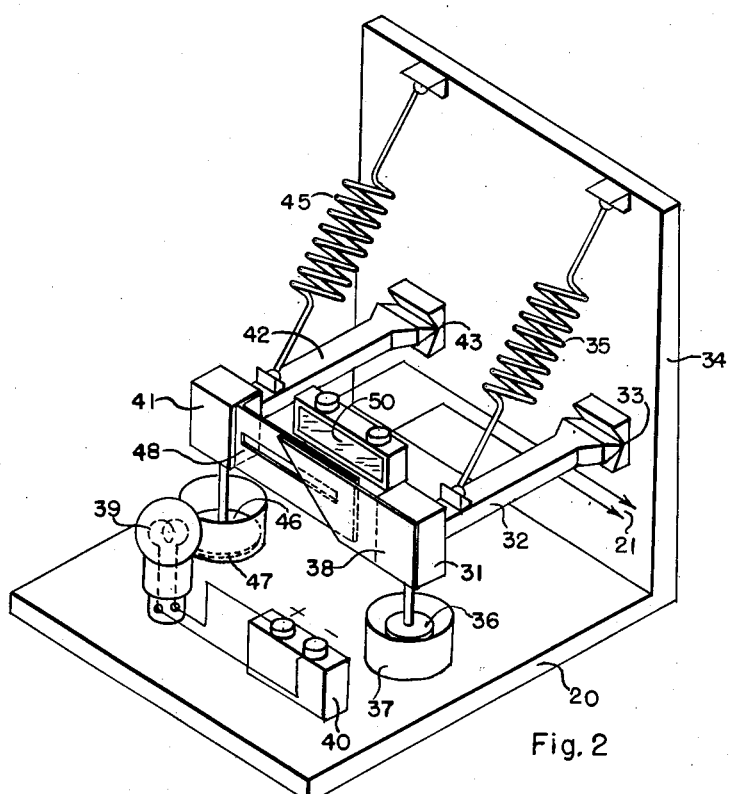
Figure 2 is a perspective detail drawing showing the movement measuring system preferred for use in the embodiment of Figure 1.

In Figure 2 is shown in some detail a preferred motion-detecting system 20 which may be the same type of system as the gravity meter itself. This system thus comprises a pair of identical masses 31 and 41, respectively on pivoted beams 32 and 42, pivoted at the points 33 and 43 to an upright portion of a frame 34. The two beams and masses are supported in an approximately horizontal position by a pair of zero-length springs 35 and 45, attached to the systems at their respective centers of gravity and fixed at the upper ends to the upright portion of the frame 34. Damping is applied to the respective systems by horizontal discs 36 and 46 immersed in oil-bath containers 37 and 47. It will be seen that the systems thus far described are substantially identical in characteristics except for the damping applied, disc 36 being small in diameter compared to disc 46. Consequently, vertical motions of the frame 34 will be almost entirely directly transmitted by the large disc 46 to the mass 41, while the transmission of the same motions by the disc 36 to the mass 31 will be considerably less. Steady accelerations, on the other hand, will affect both masses substantially equally, as will errors in leveling and the like. Consequently, the two masses will move or remain together for all except the oscillatory motions, which it is desired to measure. For these there will be a relative movement between the two suspended systems, which is preferably determined by a photo-electric system comprising a slotted mask 48 on the mass 41, which mask is covered in varying degrees by a mask 38 carried by the mass 31. This varies the intensity of light from a source 39, fed by a battery 40, to a pickup photocell 50, the output of which goes over the previously described leads 21 to the surface amplifier. The further utilization of the signal has already been described. It will, of course, be understood that for the output of this system 20 to be proportional to the actual displacements of the gravity meter, the natural frequencies of the two suspended systems must be considerably longer than the average period of the oscillations to be compensated. Since the latter are often of quite long period (three to four seconds in length), it is accordingly desirable to have the periods of the detecting beams and springs of the order of ten seconds or more. With proper design, utilizing the properties of zero-length springs, this is not too difficult a requirement.

Figure 3:
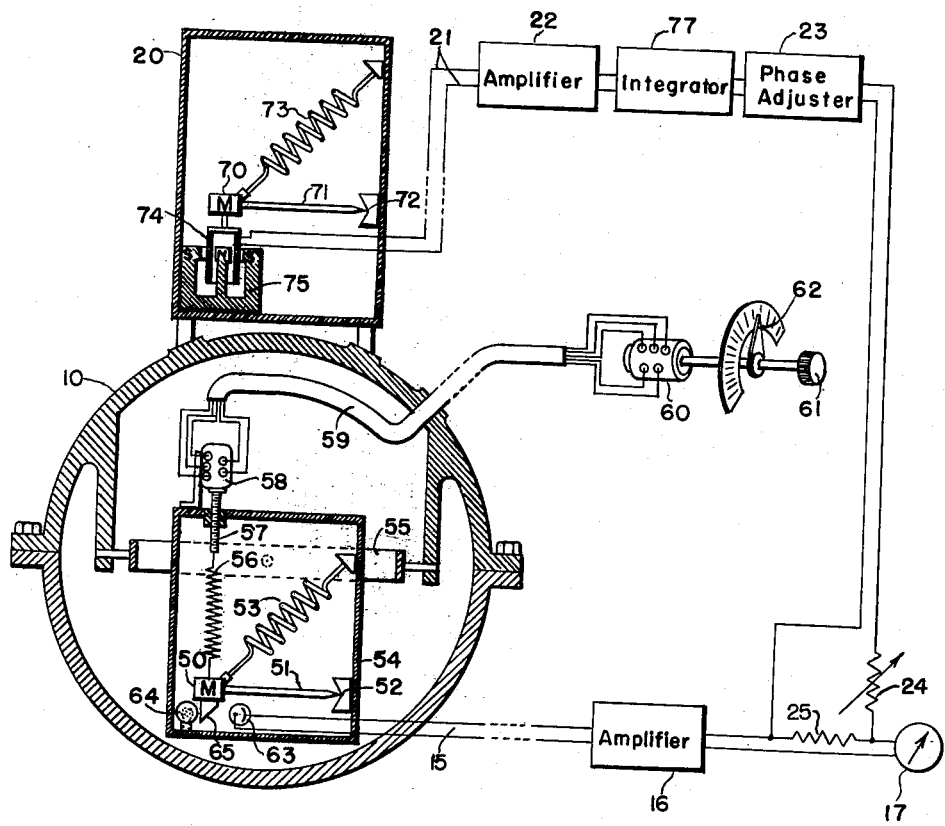
Figure 3 is a cross section and diagrammatic view showing an alternative motion-detecting and compensating system.

In Figure 3 is shown a modification of the invention described in Figures 1 and 2, in which a different movement-measuring system 20 is employed and more details of a gravity meter within housing 10 are shown. While no particular form of gravity meter is necessary in the practice of this invention, a suitable one may comprise the concentrated mass 50 attached to a beam 51 pivoted at point 52 and suspended by a zero-length spring 53 from a framework 54. The latter is mounted in a gimbal-ring assembly 55 so as to be self-leveling. Adjustment and reading of the mass 50 and beam 51 are provided by a reading spring 56 attached to the mass and suspended from a threaded rod 57 adjustably rotated by a Selsyn motor receiver 58 in the housing 10 and connected by an insulated multiple conductor cable 59 to a corresponding Selsyn motor transmitter 60 at the control station on the water surface. Selsyn 60 is adjusted by the knob 61, and the reading of the gravity meter or its null setting is taken from an appropriate pointer and scale 62. The surface indication of the position of mass 50 and beam 51 is obtained, for example, by a photocell 63 illuminated from a light source 64 which is variably shielded from the photocell 63 by a mask 65 carried on the mass 50. As in Figure 1, the output of photocell 63 is amplified by amplifier 16 and indicated on the meter or recorded 17.

The movement-measuring system 20 in this embodiment is an exactly similar mass 70, on a beam 71 similar to the gravity meter beam 51, pivoted at the point 72, and supported by the corresponding zero-length spring 73. Mass 70 carries below it an elongated coil 74 within the radial magnetic field of a cylindrical permanent magnet structure 75. Preferably, the orientations of the two beams 51 and 71 are substantially the same so that the response of motion-measuring system 20 to movements of casing 10 is exactly equal in phase and amplitude to the motion of beam 51 of the gravity meter. As is well known, the relative motion of coil 74 in the field of magnet 75 produces an electrical output over the leads 21, which is proportional to the velocity of the movement. This is amplified by the amplifier 22 and integrated in a known fashion by an integrating circuit 77, after which the output is adjusted by phase adjuster 23 and amplitude-varying resistance 24 to match the variable component of the output of amplifier 16 exactly in amplitude and phase except for the desired 180° phase difference. As before, this output applied across resistance 25 balances out the variation of the photocell system on indicator or recorder 17, and a steady reading of the latter is produced. Accordingly, it is easily possible, by rotation of knob 61, resulting in adjustment of tension of null setting spring 56 in the gravity meter, to obtain a reliable reading of the value of gravity without averaging, while, in fact, the beam 51 may be undergoing considerable deflections.

Integrator 77 will not be described in further detail, as such circuits which operate on signals from systems producing electrical signals proportional to velocity to provide output signals proportional to absolute displacement are well known in the art and are described, for example, in Welty Patent 2,309,560. In this manner the two electrical signals combined in resistor 25 are both made proportional to displacement.

Figure 4:
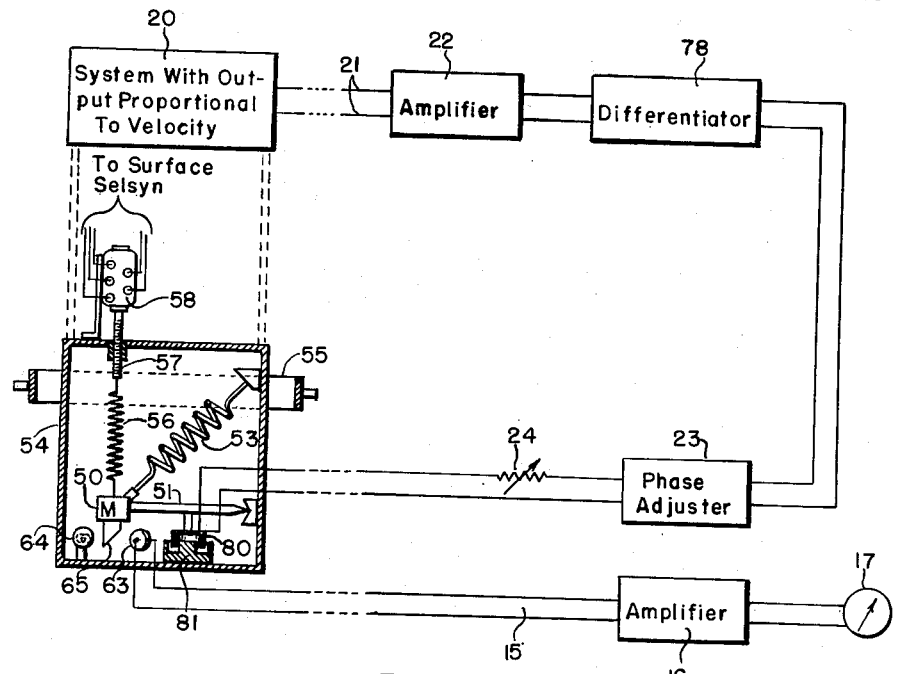
Figure 4 shows a further modification of the compensating system in which a varying force is applied to the gravity meter beam to maintain it stationary relative to the gravity meter housing.

A further modification of the system just described is shown in Figure 4. Instead of employing the output of system 20, which is proportional to the velocity of motion of housing 10, as an electrical compensation of the displacement of the gravity meter system as in Figure 3, it is here applied to a differentiating circuit 78 to produce a signal varying with the acceleration of the housing 10 and gravity meter therein. This signal, after proper phase and amplitude adjustment by the phase adjuster 23 and variable resistance 24, is applied to a coil 80 attached to gravity meter beam 51, which coil is in the radial field of a cylindrical permanent magnet structure 81. By this means, acceleration forces exactly in phase and equal in magnitude to the acceleration forces on frame 54 of the gravity meter, which would otherwise produce relative displacements between the frame 54 and the mass 50, are similarly applied to the mass 50 and beam 51 through the varying force of interaction between the coil 80 and magnet 81. As a result, the displacements of the mass 50 relative to the frame 54 due to the motion of housing 10 can be made as small as desired, or zero, and the corresponding reading of output indicator 17 is a steady reading.

It will, of course, be understood that the output of the motion-detecting system 20 described in connection with Figure 2, which varies with the displacement of gravity meter housing 10, could be differentiated twice to provide an electrical signal proportional to acceleration, which could be applied to the gravity meter system as described in Figure 4.

Figure 5:
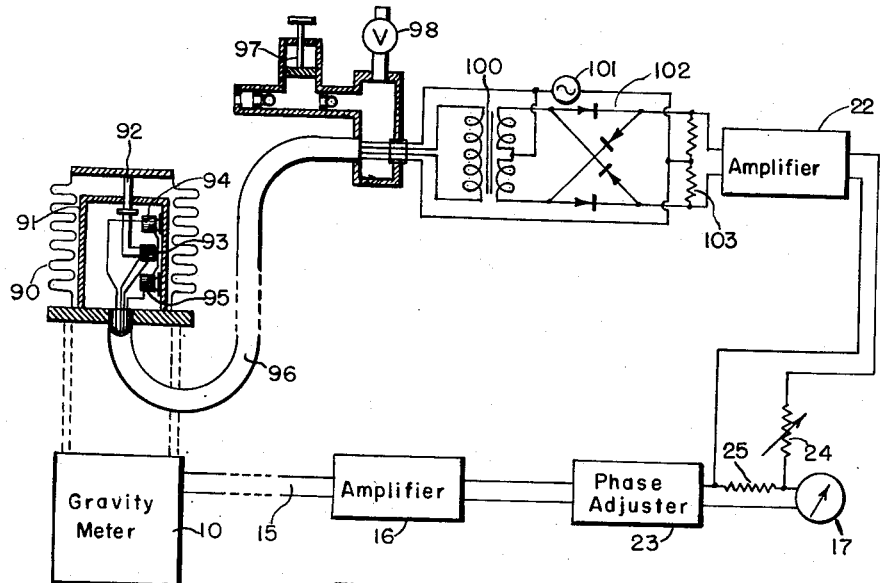
Figure 5 shows a modification of the previous systems utilizing water pressure variations as the source of compensating signal.

In Figure 5 I have shown an embodiment of my invention based on the fact that the water pressure and the displacement of the marine floor, as measured at the position of gravity meter 10, are very nearly in phase and proportional in amplitude. Accordingly, I provide a pressure-measuring instrument connected with the gravity meter housing 10 and apply the variations of this system to compensate the gravity meter system either electrically or by applying a force to the beam. A suitable pressure-measuring device comprises the sealed bellows 90, surrounding a rigid frame 91, which provides for limited longitudinal movement by the bellows 90 of a shaft 92 carrying a moveable coil 93. Coil 93 is located between a pair of fixed coils 94 and 95 fixed to the frame 91. The inside of bellows 90 is provided with an adjustabe air pressure over a hose 96, extending to the water surface and a pump 97, which hose may also carry the electrical conductors from the coils within the bellows to the water surface.

As is apparent, this coil system comprises an electromagnetic extensometer, the coil 93 being coupled to a transformer primary coil 100 at the water surface while the coils 94 and 95 are connected in series opposition and supplied with alternating exciting current from a generator or oscillator 101 at the water surface. The center tapped secondary of transformer 100 is part of a balanced or synchronous demodulating circuit 102 also connected to the oscillator 101, so that the signal output across the terminating resistance 103 of the modulator is a direct current varying in magnitude and polarity with the distance and direction of the coil 93 from the center position between coils 94 and 95. This current, proportional to the variations in water pressure at the depth of gravity meter housing 10, and thus substantially proportional to its displacement, is applied to the series balancing resistor 25 to balance out the electrical output variations on the indicator 17. The phase adjuster 23 is applied either to the output of amplifier 22 or to that of amplifier 16, as shown in this embodiment.

In operation, after the gravity meter housing 10 and bellows 90 are in position on the marine floor, the air pressure within the bellows 90 is varied, either by being increased by the pump 97 or decreased by adjustably opening a valve 98, so that the bellows extension is about midway between its possible extremes; and thus the coil 93 is positioned midway between fixed coils 94 and 95. Thereafter, the output of the system is proportional only to the variations in pressure and not to the steady value of the pressure at the depth of the gravity meter housing 10.

Figure 6:
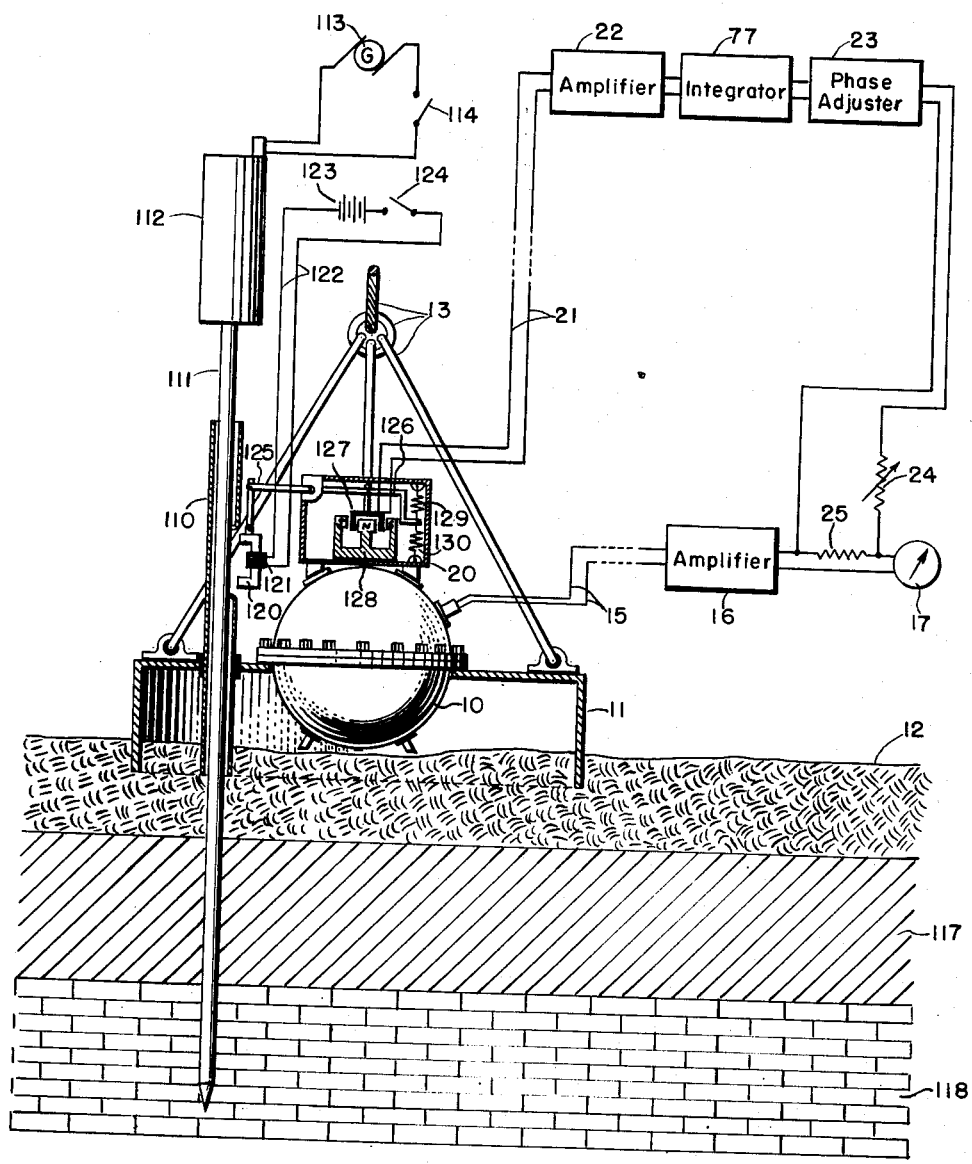
Figure 6 illustrates another embodiment of the invention, showing the manner of detecting motion relative to a more nearly stationary portion of the marine floor than that where the gravity meter is located.

In Figure 6 is shown still another embodiment of my invention in which the gravity meter housing platform 11, which is placed on the soft marine floor 12, is provided with a vertical guide tubing 110 through which is inserted a small steel piling 111, which may be equipped at its upper end with a self-driving mechanism 112. This is energized either by compressed air, or, for example, electrically from a generator 113 upon the closing of a switch 114. By this means piling 111 is held upright, after lowering of platform 11 to the marine floor 12, and is driven by mechanism 112 through the soft mud 12 and any intermediate bed 117 into a relatively consolidated and solid bed 118. Piling 111 thus is relatively fixed in position by attachment to the bed 118, while marine floor 12 oscillates relative thereto due to the variations in wave pressure, water currents, and the like.

After piling 111 is in place, a core 120, energized electromagnetically by a coil 121, is clamped to the face of the pile 111 by application of electric current from the surface over leads 122 from a battery 123 by closing a switch 124. Motion of the gravity meter housing 10 relative to the stationary piling 111 is detected by a linkage mechanism 125, extending from the core 120 to a beam 126 within the housing of motion-detector 20. Attached to this beam is a coil 127 in the radial magnetic field of a cylindrical permanent magnet 128, the beam 126 and coil 127 being held in a centralized position, prior to clamping of core 120 to the piling, by a pair of centralizing springs 129 and 130. As is believed clear, the electrical output of the magnet and coil system just described over the leads 21 is proportional to the velocity of motion of the housing 10 relative to the comparatively fixed piling 111. Consequently, after amplification by amplifier 22, the signal is integrated by an integrator 77 and applied, as in the previous embodiments, to compensate the electrical output and produce a steady reading on the indicator 17; or, alternatively, it is differentiated and applied as a compensating acceleration to the gravity meter beam. An advantage of this embodiment is the fact that a considerable magnification is possible in the linkage of the electromagnetic core 120, to the coil 126 within the housing 20. Consequently, quite large electrical signals can be provided by the output of such a system, which may, in fact, be large enough to dispense with the amplifier 22 in some cases. While electrically the output of this system is utilized as in the previous embodiments, it is considerably different in one respect, in that the use of such a system is equivalent to locating the gravity meter housing 10 on the steady bed 118 instead of on the oscillating floor 12 on the marine location.

While I have thus described my motion compensator for gravity-meter systems in terms of embodiments with considerably differing characteristics, all of these embodiments have in common an element which tends to remain stationary in space, together with means for producing an electrical output either directly proportional to the movement relative to this element or to a directly related characteristic such as the movement velocity. If this output as generated is not of the same character as the effect to be compensated in the gravity-meter system (for example, if it is proportional to velocity, whereas an acceleration is to be compensated), a conversion system changes it to an electric signal of the same character (i. e., acceleration) before it is applied in the gravity-meter system.

It should be understood that there are numerous other embodiments and possible modifications which will occur to those skilled in the art. The invention, therefore, should not be considered as limited to the exact details of the embodiments described for illustrative purposes, but its scope should be ascertained from the appended claims.

I claim:

1. A motion compensator for a gravity-measuring system including a gravity meter located on an unsteady base comprising a base-motion detecting system attached to said base and having at least one element tending to remain stationary in space, an electrical system coupled to said motion-detecting system and producing an electrical output proportional to the motion of a portion of said detecting system relative to said element, and means for applying at least a portion of said electrical output to said gravity-measuring system in a sense to produce substantial cancellation of the effect of the base motion on said gravity-measuring system.

2. A motion compensator for a gravity-measuring system including a gravity meter located on an unsteady base comprising a base-motion detecting system attached to said base and having at least one element tending to remain stationary in space, an electrical system coupled to said motion-detecting system and producing an electrical output proportional to the velocity of motion of a portion of said motion-detecting system relative to said element, means for converting said output to an electrical signal of the same character as the effect to be compensated in said gravity-measuring system, and means for applying at least a portion of said signal to said gravity-measuring system in a sense to produce substantial cancellation of the effect of the base motion on said gravity-measuring system.

3. A motion compensator for a gravity-measuring system including a gravity meter located on an unsteady base comprising a base-motion detecting system attached to said base and having at least one element tending to remain stationary in space, an electrical system coupled to said motion-detecting system and producing an electrical output proportional to the velocity of motion of a portion of said motion-detecting system relative to said element, means for differentiating said electrical output to produce an electrical signal proportional to the accelerations of the base motion acting on said gravity-measuring system, and means actuated by said electrical signal for applying a varying force to the gravity-responsive mass portion of said gravity-measuring system in a sense to reduce substantially the relative movements of said mass portion and its supporting frame due to the base motion.

4. A motion compensator for a gravity-measuring system including a gravity meter located on an unsteady base and producing an electrical indication of the accelerations acting on said system comprising a base-motion detecting system attached to said base and having at least one component tending to remain at rest, an electrical system coupled to said motion-detecting system and producing an electrical output proportional to the velocity of motion of a portion of said motion-detecting system relative to said component, means for integrating said electrical output to produce an electrical signal proportional to the displacements of said motion-detecting system relative to said component, and means for applying said signal to said gravity-measuring system in a sense to reduce substantially the variations in said electrical indication due to the base motion.

5. A motion compensator for a gravity-measuring system including a gravity meter located on an unsteady base and including means for producing electrically an indication of the displacements of the gravity-responsive mass portion of said system relative to its supporting frame comprising a base-motion detecting system attached to said base and having at least one element tending to remain stationary in space, an electrical system coupled to said motion-detecting system and producing an electrical output proportional to the displacements of a portion of said motion-detecting system relative to said element, and means for applying at least a portion of said electrical output to said displacement-indicating means in a sense to reduce substantially the variations in said indications due to the base motion.

6. A motion compensator for a gravity-measuring system including a gravity meter located on an unsteady base comprising a motion-detecting system having a pair of spring-supported masses of substantially longer oscillatory period than the oscillations of said base and means coupling each of said masses to said base with different degrees of coupling, whereby oscillations of said base are differently transmitted to said masses to produce relative displacements therebetween, means for producing an electrical output proportional to the relative displacement of said masses, and means for applying at least a portion of said output to said gravity-measuring system in a sense to produce substantial cancellation of the effects of said oscillations thereon.

7. A motion compensator for a gravity-measuring system including a gravity meter located on an unsteady base subject to periodic oscillations to which the gravity-responsive system is sensitive comprising a spring-suspended mass coupled to said base and oriented to be sensitive to said oscillations in the same way as said gravity-responsive system, means coupled to said mass for producing an electrical output related to said oscillations, and means for applying at least a portion of said output to said gravity-responsive system in a sense to produce substantial cancellation of the effects of said oscillations thereon.

8. A motion compensator for a gravity-measuring system including a gravity meter located on an unsteady base and having a first spring-suspended gravity-responsive mass comprising a second spring-suspended mass coupled to said base and oriented to be sensitive to the oscillations of said base in the same way as said first mass, means coupled to said second mass for producing an electrical output proportional to the velocity of said oscillations, means for differentiating said electrical output to produce an electrical signal proportional to the acceleration of said oscillations, and means actuated by said signal for applying to said first mass a varying force substantially preventing relative motions between said first mass and its supporting frame due to said oscillations.

9. Apparatus for marine gravity surveying comprising a gravity-responsive system including means for indicating electrically the displacements of the frame relative to a gravity-responsive mass of said system, means for measuring the variations in hydrostatic pressure at the position of said gravity-responsive system when it is located upon the marine floor, means for producing an electrical output proportional to said pressure variations, and means for applying at least a portion of said output to said gravity-responsive system in a sense to produce substantial cancellation of the effect of said pressure variations thereon.

10. Apparatus for gravity surveying on the marine floor in the presence of oscillations of said floor comprising a gravity-responsive system, means coupled to said gravity-responsive system for making contact with a relatively stationary stratum below the level of said marine floor, means for producing an electrical output proportional to the movement of said gravity-responsive system relative to said contact-making means, and means for applying at least a portion of said output to said gravity-responsive system in a sense to produce substantial cancellation of the effect of said oscillations thereon.

11. Apparatus for gravity surveying on the marine floor in the presence of oscillations of said floor comprising a substantially horizontal platform having a gravity-responsive system mounted thereon, a vertical guide attached to said platform, an elongated member adapted to be passed through said guide, means for forcing said member downwardly and imbedding it in a relatively stationary stratum below said marine floor, means for detecting relative motion between said gravity-responsive system and said elongated member and for producing an electrical output related thereto, and means for applying at least a portion of said output to said gravity-responsive system in a sense to produce substantial cancellation of the effect of said oscillations thereon.

References Cited in the file of this patent

UNITED STATES PATENTS

| Number | Name | Date |
|---|---|---|
| 2,362,616 | Cloud | Nov. 14, 1944 |